United States Patent
Ceylan Aksit et al.

(10) Patent No.: US 12,165,260 B2
(45) Date of Patent: Dec. 10, 2024

(54) GARMENT RENDERING TECHNIQUES

(71) Applicants: Adobe Inc., San Jose, CA (US); University College London, London (GB)

(72) Inventors: Duygu Ceylan Aksit, London (GB); Yangtuanfeng Wang, London (GB); Niloy J. Mitra, Potters Bar (GB); Meng Zhang, Suzhou (CN)

(73) Assignees: Adobe Inc., San Jose, CA (US); UCL Business Ltd., London (GB)

( * ) Notice: Subject to any disclaimer, the term of this patent is extended or adjusted under 35 U.S.C. 154(b) by 124 days.

(21) Appl. No.: 17/715,646

(22) Filed: Apr. 7, 2022

(65) Prior Publication Data
US 2023/0326137 A1    Oct. 12, 2023

(51) Int. Cl.
*G06T 15/04* (2011.01)
*G06T 7/70* (2017.01)
*G06T 17/20* (2006.01)
*G06V 10/75* (2022.01)

(52) U.S. Cl.
CPC ............ *G06T 17/20* (2013.01); *G06T 7/70* (2017.01); *G06T 15/04* (2013.01); *G06V 10/7515* (2022.01); *G06T 2207/20081* (2013.01); *G06T 2207/20084* (2013.01); *G06T 2210/16* (2013.01)

(58) Field of Classification Search
CPC ............................ G06T 15/04; G06T 2210/16
See application file for complete search history.

(56) References Cited

U.S. PATENT DOCUMENTS

| | | | |
|---|---|---|---|
| 2011/0273457 A1* | 11/2011 | De Aguiar | G06T 13/20 345/474 |
| 2021/0049468 A1* | 2/2021 | Karras | G06N 3/045 |
| 2022/0130111 A1* | 4/2022 | Martin Brualla | G06T 7/40 |

OTHER PUBLICATIONS

Chan et al. "Everybody Dance Now", UC Berkley, pp. 5933-5942.
Goodfellow et. al., "Generative Adversarial Nets", arXiv:1406.2661, 2014, pp. 1-9.
Holden et al. "Subspace Neural Physics: Fast Data-Driven Interactive Simulation", SCA '19, Jul. 2019, 12 pages.
Isola et al. "Image-to-Image Translation with Conditional Adversarial Networks", Berkeley AI Research (BAIR) Laboratory, UC Berkeley, pp. 1125-1134.
(Continued)

*Primary Examiner* — Matthew Salvucci
(74) *Attorney, Agent, or Firm* — Kilpatrick Townsend & Stockton LLP

(57) ABSTRACT

Systems and methods are described for rendering garments. The system includes a first machine learning model trained to generate coarse garment templates of a garment and a second machine learning model trained to render garment images. The first machine learning model generates a coarse garment template based on position data. The system produces a neural texture for the garment, the neural texture comprising a multi-dimensional feature map characterizing detail of the garment. The system provides the coarse garment template and the neural texture to the second machine learning model trained to render garment images. The second machine learning model generates a rendered garment image of the garment based on the coarse garment template of the garment and the neural texture.

20 Claims, 9 Drawing Sheets
(5 of 9 Drawing Sheet(s) Filed in Color)

(56) References Cited

OTHER PUBLICATIONS

Loper et al. "SMPL: A Skinned Multi-Person Linear Model", ACM Transactions on Graphics, vol. 34, No. 6, Article 248, published Nov. 2015, pp. 1-16.
Park et al. "Semantic Image Synthesis with Spatially-Adaptive Normalization", arXiv:1903.07291v2 [cs.CV] Nov. 5, 2019, pp. 1-19.
Prokudin et al. "SMPLpix Neural Avatars from 3D Human Models", 10 pages.
Raj et al. "ANR: Articulated Neural Rendering for Virtual Avatars", arXiv:2012.12890v1 [cs.CV] Dec. 23, 2020, pp. 1-10.
Thies et al. "Deferred Neural Rendering: Image Synthesis using Neural Textures", arXiv:1904.12356v1 [cs.CV] Apr. 28, 2019, pp. 1-12.
Wang et al., "Learning an Intrinsic Garment Space for Interactive Authoring of Garment Animation", ACM Trans. Graph., vol. 38, No. 6, Article 220, published Nov. 2019, pp. 1-12.
Wang et al. "Learning a Shared Shape Space for Multimodal Garment Design", vol. 36, No. 4, Article 1, published Jul. 2017, arXiv:1806.11335v2 [cs.GR], Jul. 14, 2018, pp. 1-13.
Zhang et al. "Dynamic Neural Garments", ACM Trans. Graph., vol. 40, No. 6, Article 235, published Dec. 2021, pp. 1-15.

\* cited by examiner

300

PROVIDE POSITION DATA TO A FIRST MACHINE LEARNING MODEL TRAINED TO GENERATE COARSE GARMENT TEMPLATES OF A GARMENT
302

GENERATE, BY THE FIRST MACHINE LEARNING MODEL, A COARSE GARMENT TEMPLATE OF THE GARMENT BASED ON THE POSITION DATA
304

PRODUCE A NEURAL TEXTURE FOR THE GARMENT, THE NEURAL TEXTURE COMPRISING A MULTI-DIMENSIONAL FEATURE MAP CHARACTERIZING DETAIL OF THE GARMENT
306

PROVIDE THE COARSE GARMENT TEMPLATE AND THE NEURAL TEXTURE TO A SECOND MACHINE LEARNING MODEL TRAINED TO RENDER GARMENT IMAGES OF THE GARMENT
308

GENERATE, BY THE SECOND MACHINE LEARNING MODEL, A RENDERED GARMENT IMAGE OF THE GARMENT BASED ON THE COARSE GARMENT TEMPLATE AND THE NEURAL TEXTURE
310

FIG. 3

GARMENT RENDERING TECHNIQUES

TECHNICAL FIELD

This disclosure generally relates to image rendering techniques. More specifically, but not by way of limitation, this disclosure relates to improved machine learning-based techniques for efficiently rendering garments to reflect detail and motion.

BACKGROUND

When rendering an object such as an image of a human wearing a garment, the garments include characteristic details such as creases and folds. These details arise from a variety of factors including stitching patterns, underlying materials, or printed patterns on the base fabrics. The garments should deform realistically to synthesize a plausible experience.

Typically, to render an image of a garment, a garment mesh is modeled using real-world stitching patterns for guidance. Mesh dynamics are anticipated using physical simulation under the action of body movements. A resultant dynamic mesh is modeled using texture information. Achieving realistic results using this workflow is tedious and expensive due to the high level of precision required across the modeling, simulation, and rendering stages. Further, much of the process must be repeated when factors such as garment details, body motion, or viewing camera location are updated. Other techniques can simplify certain phases of this process, but tend to generate garments that appear stiff as the baked-in details do not move realistically, particularly on loose garments. The techniques described herein address these problems and others.

SUMMARY

The present disclosure describes techniques for rendering a garment to reflect motion. More particularly, new and improved techniques are described for using a dual-stage process. A first machine learning model renders a coarse garment, which is deformed to reflect motion. A second machine model renders final garment images that reflect both the motion and garment texture details.

In some embodiments, a rendering system includes a first machine learning model trained to generate coarse garment templates of a garment and a second machine learning model trained to render garment images. The coarse garment template is an intermediate representation that reflects dynamics of the garment in motion with simplification of garment details. The first machine learning model generates a coarse garment template based on position data. The rendering system learns a neural texture for the garment, which is a multi-dimensional feature map characterizing detail of the garment. Based on the coarse garment template and the neural texture, the second machine learning model renders a final garment image reflecting the motion and the textural details. By applying this multi-stage approach, the above-noted challenges in directly generating garments in motion are addressed, providing improvements to the appearance of the rendered garment as well as improvements to computational efficiency.

Various embodiments are described herein, including methods, systems, non-transitory computer-readable storage media storing programs, code, or instructions executable by one or more processors, and the like.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features, embodiments, and advantages of the present disclosure are better understood when the following Detailed Description is read with reference to the accompanying drawings.

FIG. 3 depicts an example of a process for rendering a garment in motion according to certain embodiments of the present disclosure.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes techniques for efficiently rendering garments that reflect motion over time realistically. More particularly, new and improved techniques are described for rendering a garment under motion sequences using a multi-stage pipeline of machine learning models. The models are trained to synthesize a garment in various positions and angles. At runtime, a new body motion sequence and user-specified camera parameters are provided, and rendered garment frames are generated to reflect the motion over time. As noted above, dynamically rendering garments is challenging. This is particularly challenging for loose garments, due to the highly nonlinear nature of garment dynamics. Using the techniques of the present disclosure, three-dimensional (3D) dynamics of a coarse garment template are generated as an intermediate representation. Dynamic neural features are learned over the coarse garment template. The learned features capture both geometric differences between the target garment (e.g., laces, ruffles, etc.) and dynamic appearance changes (e.g., the appearance of folds under body motion). The features are dynamic in that overall movement is captured by geographic displacement across frames as well as because the learned neural features are concatenated with body joint information before being interpolated and rendering. The neural features and coarse garment template are used to synthesize the final appearance of the rendered garment.

In some embodiments, the garment is rendered using an encoder-decoder network including an encoder structure that explicitly models temporal correlations, and a decoder implemented as a generative adversarial network (GAN) including a temporal discriminator to ensure that synthesized consecutive frames are temporally coherent. These techniques, as further described herein, provide motion driven rendering where input body motion sequences are used to render realistic garments. The neural rendering is dynamic and deferred based on the intermediate coarse garment template to synthesize varying motion appearance with the target colors and textures. The trained machine learning models are able to generalize across views and motions. This provides savings in time and computational resources by avoiding explicitly modeling, rendering, and simulating garment sequences for every new motion sequence.

Figure 1:
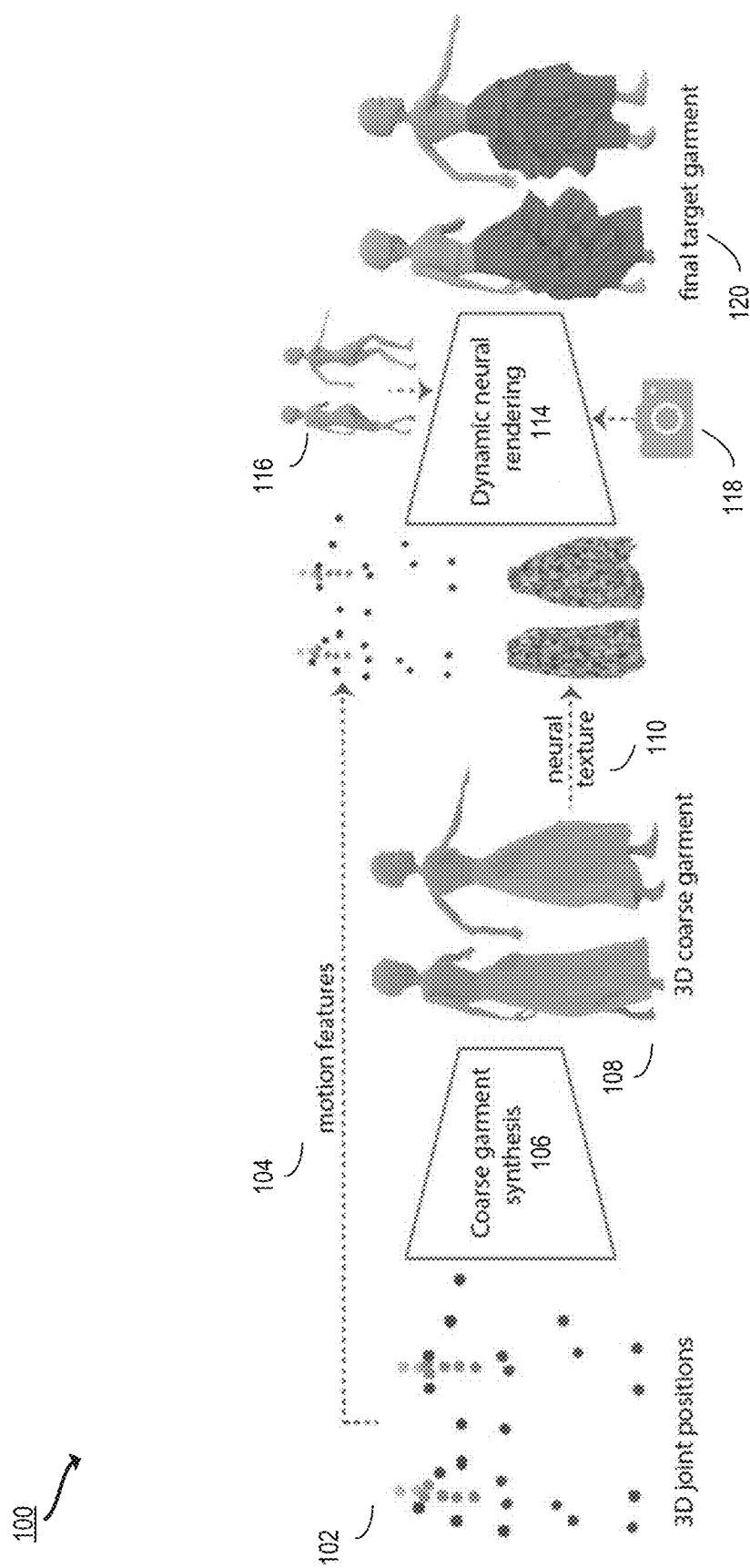
FIG. 1 depicts an example overview garment rendering process according to certain embodiments of the present disclosure.

FIG. 1 depicts an example overview process 100 for garment rendering according to certain embodiments. In some embodiments, the process 100 is used to perform animation using a three-dimensional (3D) mesh which represents an object such as a person wearing clothing. The 3D mesh is made up of vertices, or locations in space, connected by edges. Certain vertices are established as joints, or points of articulation, which are used to control motion. In some examples, degrees of freedom and orientations are established for the joints. For example, an elbow joint and a wrist joint are established with parameters to control realistic arm motion.

In some embodiments, the process 100 begins with 3D joint positions 102 of an object mesh, which may correspond to different positions over time as the object moves. The 3D joint positions 102 are provided as input to coarse garment synthesis network 106. The coarse garment synthesis network 106 is a first machine learning model trained to generate a coarse garment template, as further described below with respect to FIG. 2. The coarse garment synthesis network 106 generates as output a 3D coarse garment template 108. The 3D coarse garment template 108 is an intermediate representation of a garment. In some aspects, the 3D coarse garment template 108 is simplified. For example, the 3D coarse garment template removes patterns, textures, ruffles, bows, and so forth.

The 3D joint positions 102 are also used to generate motion features 104, which are positions on the surface of the coarse garment. In some embodiments, the motion features 104 are invariant to different camera parameters. In some embodiments, the motion features 104 are used to generate a motion feature image 116, which encodes a distance between vertexes and joints using multiple channels. A neural texture 110 is determined. A neural texture is a feature map that is learned. In some embodiments, the neural texture 110 is a d-dimensional neural texture for the coarse garment, which is learned based on training data 242. User-specified camera parameters 101 can also be provided to establish a field of view.

The neural texture 110, 3D coarse garment template 108, motion feature image 116, and camera parameters 118 are provided as input to a dynamic neural rendering network 114. In some embodiments, the dynamic neural rendering network is a second machine learning model which has been trained to generate a final target garment 120 (e.g., a rendered garment). The process 100 for rendering a garment is described in further detail below with respect to FIGS. 3-4.

Figure 2:
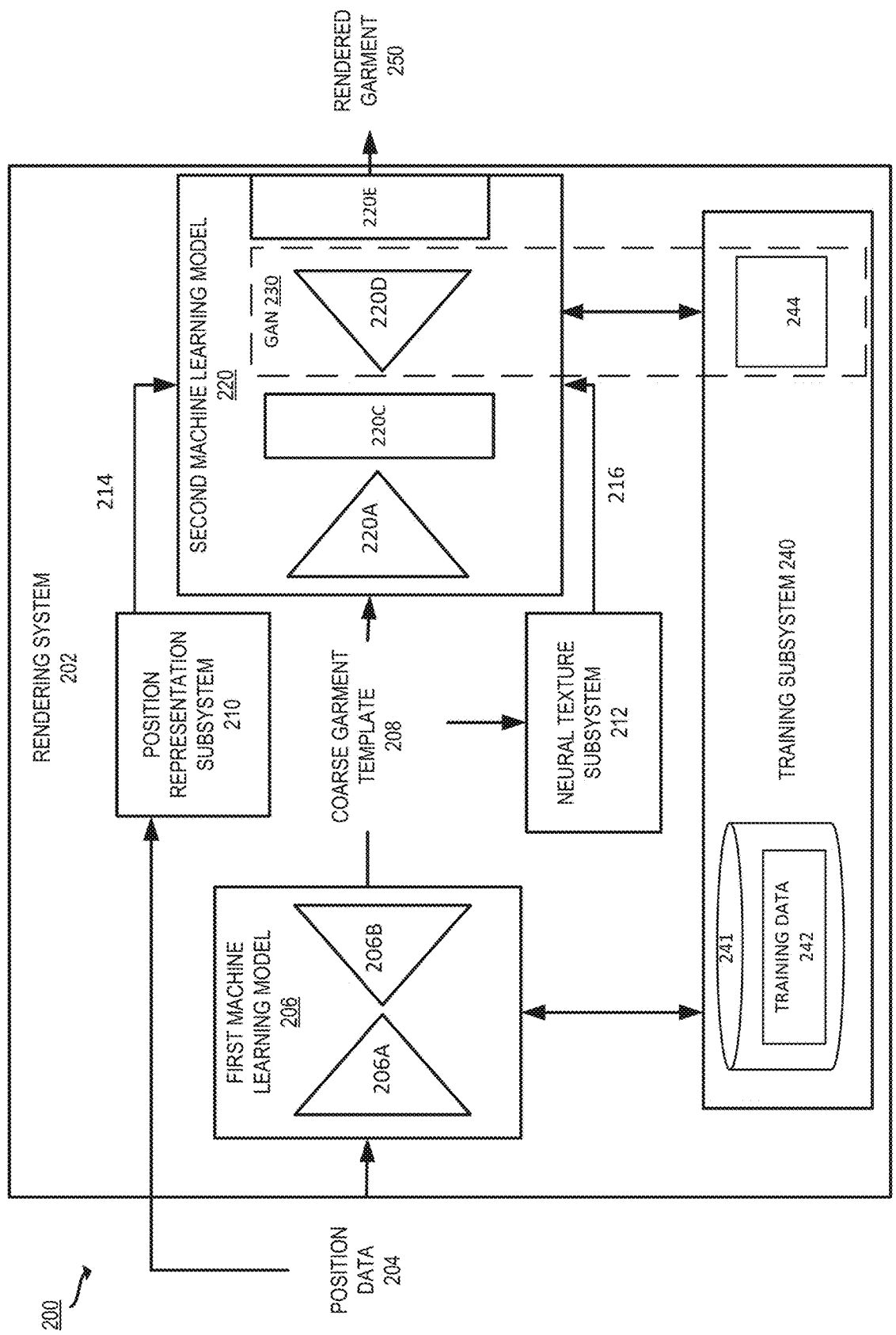
FIG. 2 depicts an example of a computing environment for garment rendering according to certain embodiments of the present disclosure.

FIG. 2 depicts an example of a computing environment 200 in which a rendering system 202 generates a rendered garment 250 reflecting position data 204. In the example depicted in FIG. 2, the rendering system 202 receives the position data 204 as input. In some embodiments, the position data 204 is received from an external computing device (e.g., via an editor interface). Alternatively, or additionally, the position data 204 is established on the computing device executing the rendering system 202. The position data 204 is processed by components of the rendering system 202 including a first machine learning model 206, a position representation subsystem 210, a neural texture subsystem 212, and a second machine learning model 220, to generate as output the rendered garment 250. The components of the rendering system 202 include trained machine learning models which are trained using a training subsystem 240 using training data 242. In some implementations, the training subsystem 240 includes, or is communicatively coupled to, one or more data storage units 241 for storing the training data 242.

The various subsystems of the rendering system 202 can be implemented in the same computing system or different, independently operated computing systems. For example, the first machine learning model 206 could be a separate entity from the position representation subsystem 210, a neural texture subsystem 212, and a second machine learning model 220, or the same entity.

The first machine learning model 206 is a machine learning model trained to generate a coarse garment template 208 based on position data 204. In some implementations, the first machine learning model 206 includes one or more neural networks. In the example depicted in FIG. 2, the first machine learning model 206 includes an encoder 206A and a decoder 206B. The encoder 206A includes code configured to discover a latent space representation. The latent space representation (also referred to as a latent code) is a string of numbers that, when processed by the decoder 206B, generates a coarse garment template 208. In some examples, the encoder 206A includes an auto-encoder that learns a latent space representation of compact representation of the coarse garment template 208. In some implementations, the encoder 206A is a shape encoder that takes as input a v×3 dimensional vector as input, where v is a number of vertices in the coarse garment template, and maps it into the latent space through 6 fully connected layers of dimensions 2048, 1024, 512, 256, 128, and 64. In some implementations, the decoder 206B is a neural network trained to generate a coarse garment template based on the latent space representation produced by the encoder 206A. For example, the decoder 206B is configured to reverse the above-noted process performed by the encoder 206A symmetrically.

In some embodiments, the position representation subsystem 210 is configured to generate a motion feature image 214 representing 3D positions of points on the surface of the garment. The position representation subsystem 210 takes as input the position data 204 and generates a motion feature image 214, as further described with respect to FIG. 3. The motion feature image 214 is then provided as input to the second machine learning model 220.

In some embodiments, the neural texture subsystem 212 is a machine learning model such as a neural network (e.g., a third machine learning model). The neural texture subsystem 212 learns to generate a neural texture 216, which is a learned d-dimensional feature map describing features of a garment. These features of the garment can include details such as color and texture. In some examples, the neural texture subsystem 212 learns deep neural features for controllable image synthesis including viewpoint changes and modeling deformations. The neural texture subsystem 212 generates the neural texture 216 based on the coarse garment template 208. The neural texture subsystem 212 provides the neural texture 216 to the second machine learning model for further processing.

The second machine learning model 220 is a model trained to generate an image including a rendered garment 250. In some examples, the second machine learning model 220 generates the rendered garment 250 based on the motion feature image 214, the coarse garment template 208, and/or the neural texture 216. In some embodiments, the second machine learning model includes multiple subcomponents including neural networks, which may include an encoder 220A, a Spatially Adaptive Normalization (SPADE) block 220C, a decoder 220D, and a postprocessor 220E.

In some embodiments, the encoder 220A includes a set of convolutional layers that encode latent space representations. In some implementations, the encoder 220A encodes input neural descriptor maps into latent space representations. Given two consecutive frames, the encoder 220A encodes the frames in to the latent space to produce sequential latent space representations. In some examples, the encoder 220A includes convolutional layers that encode the neural texture in a temporally coherent fashion to generate latent space representations of consecutive frames.

In some embodiments, the SPADE block 220C normalizes a signal conditioned with the concatenation of a latent code at a first time and a latent code at a second time (e.g., at two consecutive times). This enables extraction of temporal dependency between consecutive frames at each spatial location. (See Park et al., "Semantic Image Synthesis with Spatially-Adaptive Normalization," in *Proceedings of the IEEE Conference on Computer Vision and Pattern Recognition* (2019). In some examples, the SPADE block 220C generates a normalized latent code and provides the normalized latent code to the decoder 220D for further processing.

In some embodiments, the decoder 220D is configured to generate an image based on the normalized latent space representation. For example, the decoder 220D includes a set of convolutional layers (e.g., ConvTranspose2D layers symmetric to the encoder). In some implementations, the decoder 220D includes a generator 132, which is part of a Generative Adversarial Network (GAN) 230. A GAN is a type of machine learning framework where a generator and discriminator are trained together in a zero-sum game (see Goodfellow et. al., Generative Adversarial Networks, arXiv: 1406.2661 (2014)). In some implementations, the decoder 220D provides the image to the postprocessor 220E for further processing.

In some embodiments, the postprocessor 220E processes the image generated by the decoder 220D to generate as output the rendered garment 250. In some examples, post-processing includes compositing the garment with other objects such as a body wearing the garment and a background. For example, the postprocessor 220E includes a layer blending module that blends the image generated by the decoder 220D with features extracted from a background image. This results in an output image including the rendered garment 250.

The training subsystem 240 includes hardware and/or software configured to train one or more machine learning models as used by the rendering system 202. The training subsystem 240 includes functionality to train the first machine learning model and the second machine learning model using loss functions that are minimized to train the machine learning models to perform their respective tasks. In some embodiments, the training subsystem 240 includes a discriminator 244. The discriminator 244 is part of the GAN 230 including the decoder 220D, and evaluates the output of the decoder 220D to train the decoder 220D. In some aspects, the training subsystem further includes functionality to train other components of the rendering system 202 such as the neural texture subsystem 212 and/or position representation subsystem 210.

The data storage unit 241 can be implemented as one or more databases or one or more data servers. The data storage unit 241 includes training data 242 that is used by the training subsystem 240 to train the components of the rendering system 202. The training data 242 may include ground truth images of objects in motion. In some embodiments, the training data 242 includes both ground truth images of garments in various poses and ground truth images of coarse garment templates in various poses. The training data 242 may include many different motions, such as running, jumping, twirling, and so forth. In various examples, the training data 242 is generated using more computationally expensive methods, drawn manually, recorded on video, and so forth. As a specific example, the training subsystem generates a synthetic dataset using virtual avatars, rigs and animates each avatar to generate a training motion sequence, which may include hundreds or thousands of frames. Ground truth mesh sequences are generated for both the coarse garment template and the detailed target garments. A set of random camera positions may further be used to ensure generalization across camera views. In some embodiments, training coarse garment templates are generated. For example, an artist or machine learning model designs training coarse garment images by removing selected details from images of a garment.

FIG. 3 is a flowchart of an example process 300 for generating a rendered garment according to certain embodiments of the present disclosure. In some implementations, one or more process blocks of FIG. 3 may be performed by a rendering system (e.g., the rendering system 202 of FIG. 2). In some implementations, one or more process blocks of FIG. 3 may be performed by another device or a group of devices separate from or including the rendering system.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

In some embodiments, at step 302, the rendering system provides position data to a first machine learning model trained to generate coarse garment templates of a garment. As described above with respect to FIGS. 1 and 2, position data such as a set of 3D joint positions is provided to the first machine learning model as input. In some implementations, the position data is over time, reflecting motion of the 3D joint positions at a set of different times.

In some embodiments, at step 304, the first machine learning model generates a coarse garment template of the garment based on the position data. For example, the first machine learning model generates the coarse garment template from joint position data over time. For a set of frames, the first machine learning model represents a pose at each frame based on positions of a set of joints. In some implementations, the pose is combined at the current frame and one or more prior frames to define a motion descriptor for a given time. In some embodiments, the first machine learning model has been trained to generate a particular style of coarse garment template (e.g., for a particular garment). Based on the input position data, the first machine learning model generates this coarse garment template in the corresponding pose.

In some implementations, the first machine learning model includes an encoder and decoder (e.g., as shown in FIG. 2). The first machine learning model has been trained to learn representations of the coarse garment template as it moves over time. For example, 2, the first machine learning model includes an auto-encoder and a motion encoder network, as described in Wang et al., "Learning an Intrinsic Garment Space for Interactive Authoring of Garment Animation," in *ACM Transaction son Graphics*, 38, 6 (2019). The auto-encoder learns a compact representation of the coarse garment template as it deforms under varying motions. The encoder can learn the coarse garment template by generating a latent space representation of the coarse garment template, then passing this latent space representation to a decoder to generate an estimated coarse garment template. The generated estimated coarse garment template is optimized with respect to the coarse garment template. The motion encoder network maps a given motion descriptor to a corresponding latent space representation of the coarse garment template at a given frame. Given a new motion descriptor, the motion encoder network generates a coarse garment geometry by applying the auto-encoder and decoder in turn to this motion descriptor to generate a coarse garment sequence $V_t^c$ over time. This can be performed in a similar fashion as described in Wang et al., supra. Alternatively, or additionally, the coarse garment can be generated using other techniques such as Skinned Multi-Person Linear (SMPL) body fits (see Loper et al., "SMPL: a Skinned Multi-Person Linear Model," *ACM Trans. Graph. (TOG)— Proc. ACM SIGGRAPH Asia* 34(6), 248: 1-248: 16 (2015)), partial character bodies, or coarse templates animated by a physics engine. In some embodiments, the resulting coarse garment template is not only a downsampled version of the desired garment, but is also free of certain geometric details such as laces or multi-layer components.

In some embodiments, at step 306, the rendering system (e.g., the neural texture subsystem 212 shown in FIG. 2) produces a neural texture for the garment. As described above, a neural texture is a multi-dimensional feature map characterizing image detail (e.g., garment detail, specifying features such as color and texture). For example, the rendering system produces the neural texture by learning a d-dimensional neural texture F for the coarse garment template $V_c$. In some examples, the neural texture overlays detail on the coarse garment template. In some implementations, a multi-scale representation of the neural texture is generated as described in Thies et al., "Deferred Neural Rendering: Image Synthesis Using Neural Textures," *ACM Transactions on Graphics* 38, 4 (2019). In some implementations, the technique described in Thies is simplified by learning the neural texture hierarchy of four layers and refraining from encouraging the first three channels of the neural texture to be similar to the RGB (red-green-blue) color of the corresponding pixel in the target image. The neural texture is then sampled from a viewpoint p to generate a neural feature image $F_t^p$.

In some embodiments, to encode pose-specific appearance changes of the target garment, the neural texture is conditioned on motion features. In some examples, the position representation subsystem of the rendering system generates a motion feature image representing three-dimensional (3D) positions of points on a surface of the garment. For example, for each pixel in the garment rendering at frame t from a viewpoint p, the position representation subsystem computes the 3D position of the corresponding location on the surface of the deformed coarse garment via a barycentric coordinate $v_t^i$. The position representation subsystem forms a J dimensional motion feature image $\widehat{S_t^p}$, where, for each pixel i the $j^{th}$ channel encodes the distance of the corresponding vertex to the $j^{th}$ joint:

$$\widehat{S_t^p}(i,j) := \exp(-\|v_t^i - M_t^j\|^2/\sigma),$$

where $v_t^i$ are the vertices on the coarse garment, $M_t^j$ are the joint positions, and σ is a configured constant. While encoding the distance between the vertices and the joints, as the distance increases, the effect of that joint should be minimized. The exponential (exp) function helps to perform this weighting and σ controls how fast the weights drop. More specifically, as σ is chosen to be smaller, the threshold of distances that are mapped to zero also gets smaller. In some examples, σ is set empirically. In some implementations, the motion feature images are concatenated along a channel dimension to construct a motion feature image $S_t^p$ with J×(L+1) channels, where J is a number of body joints and L is a number of sampled previous frames. Examples of suitable values are J=19 and L=5. This incorporates the motion information in the past L frames.

In some embodiments, the rendering system concatenates the motion feature image with the neural texture map. For example, the rendering system concatenates the motion feature image $S_t^p$ with the neural feature image $F_t^p$ to generate a neural descriptor map $$Q_t^p := [F_t^p S_t^p]$$

with J×(L+1) channels. In some examples, each neural descriptor map consists of per-pixel neural features of dimension 64 sampled from a four-level, 16 channel neural texture hierarchy.

In some embodiments, at step 308, the rendering system provides the coarse garment template and the neural texture (e.g., the neural texture map $Q_t^p$ of the neural texture) to a second machine learning model trained to render a rendered garment image of the garment. For example, with reference to FIG. 2, the first machine learning model 206 provides the coarse garment template 208 to the second machine learning model 220 and the neural texture subsystem 212 provides the neural texture 216 to the second machine learning model 220. In some implementations, the position representation subsystem 210 also provides the motion feature image 214 as input to the second machine learning model 220.

In some embodiments, at step 310, the second machine learning model generates a rendered garment image of the garment based on the coarse garment template and the neural texture. For example, referring to FIG. 2, second machine learning model includes an encoder 220A, a SPADE block 220C, a decoder 220D, and a postprocessor 220E. The neural descriptor maps of two consecutive frames $Q_t^p$ and $Q_{t-1}^p$ (e.g., as generated by the neural texture subsystem at step 306) are provided as input to the encoder of the second machine learning model. The encoder encodes the neural descriptor maps $Q_t^p$ and $Q_{t-1}^p$ into latent codes $Z_t^p$ and $Z_{t-1}^p$. Thus, the encoder generates a first latent space representation of a first coarse garment template at a first time and a second latent space representation of a second coarse garment template at a second time. This is repeated for multiple frames. In some implementations, the encoder first down-samples the resolution of the input maps (e.g., from 512×512 to 16×16), then increases the feature dimension to 512 using two-dimensional convolution layers, each with a leaky Rectified Linear Unit (ReLU) activation.

In some embodiments, the latent space representations of the first coarse garment templates at the different times $Z_t^p$ and $Z_{t-1}^p$ are provided as input to the SPADE block. The SPADE block generates a normalized latent space representation of the coarse garment template. The SPADE block normalizes a latent space representation $Z_t^p$ of a frame into a normalized latent space representation of a frame $\widehat{Z_t^p}$ conditioned by $Z_{t-1}^p$. In some implementations, the output of the SPADE block is 16×16×512. This output is then provided to 2D convTranspose layers to increase the output resolution to 512×512 while maintaining high dimensional features of size 33.

In some embodiments, the normalized latent space representation of the frame is provided as input to the decoder. As described above with respect to FIG. 2, in some implementations, the decoder of the second machine learning model is a generator of a GAN, e.g., a multi-layered convolutional neural network. The decoder synthesizes a garment image based on the normalized latent space representation of the coarse garment template. In some examples, the decoder repeats this process for multiple frames to generate animation frames of the garment. In some examples, in addition to inputting the normalized latent space representation to the decoder, the rendering system also inputs a background image into the second machine learning model for each given frame. For example, the garment is worn by a person, and each frame of an animation of a person moving is generated separately (e.g., using traditional animation techniques). In some implementations, the output of the decoder is further processed by the postprocessor 220E to blend the garment and the background. Techniques for generating the rendered image using the second machine learning model are now described in further detail with respect to FIG. 4.

Figure 4:
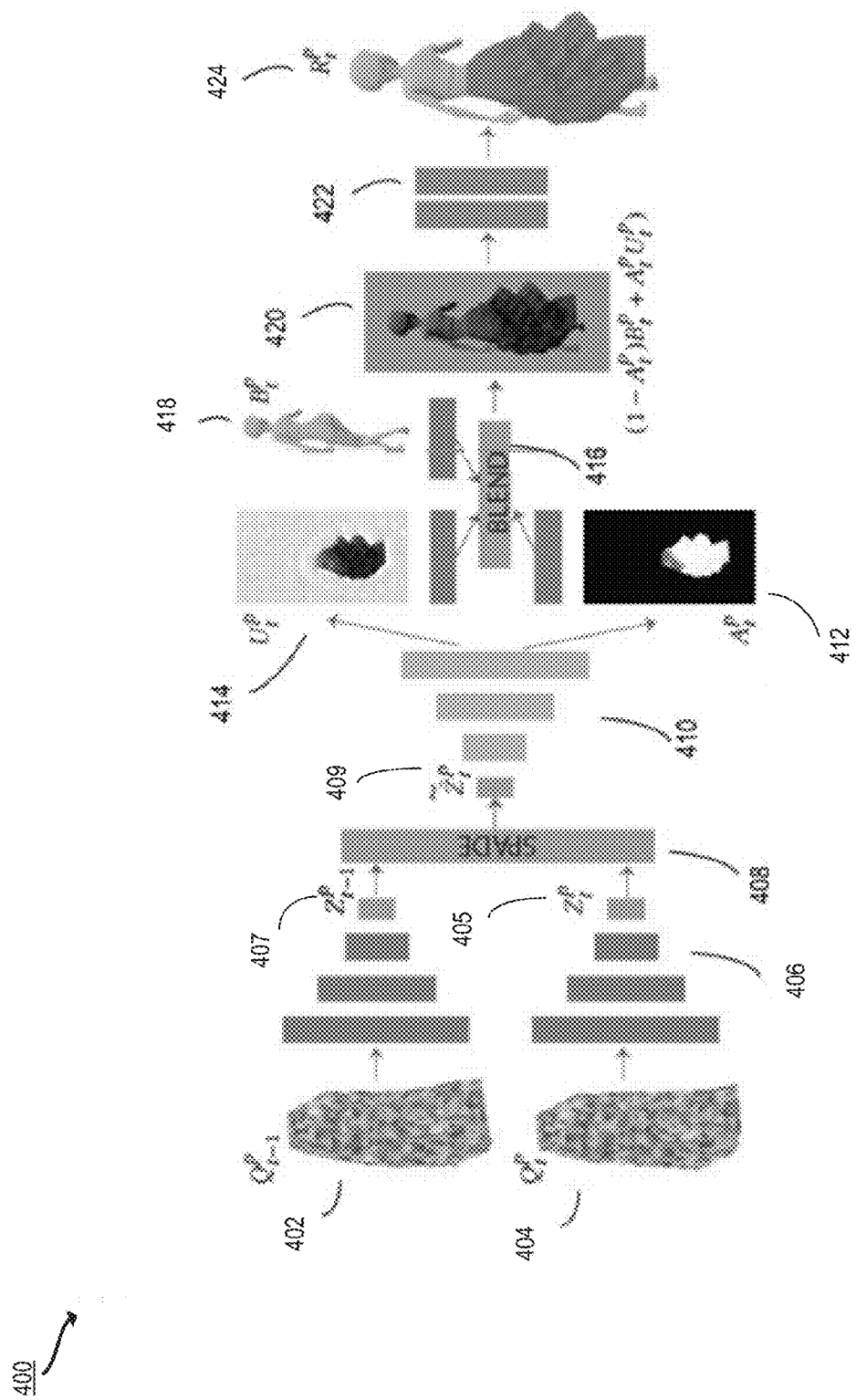
FIG. 4 depicts a schematic diagram illustrating garment rendering techniques according to the process of FIG. 3.

FIG. 4 is a schematic diagram illustrating a process 400 for generating a rendered image including a garment, e.g., at step 310 of FIG. 3. The process 400 is performed by the second machine learning model of the rendering system. As described above with respect to FIG. 2, in some embodiments, the second machine learning model includes an encoder 406, a SPADE block 408, a decoder 410, and a postprocessor, which may include a layer blending module 416 and resnet layer 422, as shown in FIG. 4.

As described above with respect to step 310 of FIG. 3, in some embodiments, the second machine learning model initiates generating the rendered garment by providing as input to the encoder 406 neural descriptor maps at two consecutive points in time—a first neural descriptor map of a frame $Q_t^p$ 402 and a second a first neural descriptor map of a frame $Q_{t-1}^p$ 404. The encoder 406 generates a latent space representation of the first neural descriptor map $Q_t^p$ 402, $Z_t^p$ 405, and a latent space representation of the second neural descriptor map 404, $Z_{t-1}^p$. 407. In some examples, the encoder 406 includes a set of convolutional layers that encode input neural descriptor maps $Q_t^p$ into latent space representations $Z_t^p$.

In some embodiments, the second machine learning model provides the latent space representations 405 and 407 as input to the SPADE block 408. The SPADE block 408 normalizes the latent space representations 405 and 407 to produce a normalized latent space representation 409 $\widehat{Z_t^p}$. This normalization with respect to a previous frame extracts temporal dependency between consecutive frames across spatial locations. In some examples, the SPADE block 408 first normalizes the input feature map using parameters learned from sequential latent space representations. As a specific example, the SPADE block learns parameters scale and bias with respect to each channel and spatial location (e.g., as described in Park et al., supra). For an input signal w, the SPADE block computes a normalized signal $\tilde{w}$ as $$\tilde{w}[c, x, y] := \text{SPADE}(w) = \gamma_{c,x,y} \frac{w[c, x, y] - \mu_c}{\sigma_c} + \beta_{c,x,y}$$

where $\mu_c$ is the mean deviation of w in channel c, and $\sigma_c$ is the standard deviation of w in channel c. The SPADE blocks are residually applied to $Z_t^p$ as $$\tilde{Z}_t^p = \text{SPADE}(I(\text{SPADE}(I(Z_t^p)))) + \text{SPADE}(I(Z_t^p))$$

where l( ) is an instance normalization layer.

In some embodiments, the normalized latent space representation is provided as input to the decoder 410. As described above with respect to FIG. 2, in some examples, the decoder 410 includes a set of ConvTranspose2D layers symmetric to the encoder 406. The decoder 410 takes as input the normalized latent space representation $\widehat{Z_t^p}$ and generates a feature image $U_t^p$ 414. In some implementations, the feature image $U_t^p$ 414 has the same width and height as a target rendering. Based on the latent space representation, the feature image $U_t^p$ 414 captures the appearance and dynamics of the target garment.

In some embodiments, the rendering system provides a background image $B_t^p$ 418 to the second machine learning model. In some examples, the background image $B_t^p$ 418 includes a character body and/or other background such as a room, sky, other characters, and so forth. The background image $B_t^p$ 418 may be generated by another subsystem of the rendering system or an external system (e.g., using conventional animation techniques, video recording, or other suitable means). The second machine learning model composites the garment feature image $U_t^p$ 414 with a background image $B_t^p$ 418. In some implementations, the postprocessor 220E of the second machine learning model depicted in FIG. 4 includes a layer blending module 416. The layer blending module 416 blends garment feature image $U_t^p$ 414 with features $\widehat{B_t^p}$ extracted from background image $B_t^p$ 418. In some examples, the postprocessor generates a mask $A_t^p$. The postprocessor learns the mask $A_t^p$ and applies the mask to blend the foreground and background to generate a blended image given by:

$$(1-A_t^p) \cdot \widehat{B_t^p} + A_t^p \cdot U_t^p$$

(420). In some implementations, the postprocessor applies the blended image 420 to two residual convolution blocks of the resnet layer 422 to refine the result and generate a final rendered garment $R_t^P$ 422. In some examples, the final rendered image has a size of 512×512 in RGB color space.

In some embodiments, the training subsystem trains the machine learning models prior to the processing of FIGS. 3 and 4. In some embodiments, the training subsystem of the rendering system trains the decoder of the second machine learning model G and the neural texture subsystem F end-to-end and jointly. Given a rendered garment $R_t^P$ synthesized by the network and a ground truth image $I_t^P$, one or more loss functions are minimized. For example, the decoder is a generator of a GAN implemented as a neural network (e.g., a decoder neural network). An error between output generated by decoder neural network and the ground truth is backpropagated. Values of weights associated with connections in the decoder are updated. The process is repeated, computing the loss and readjusting the weights, until an output error is below a predetermined threshold. The training subsystem performs multiple iterations of a training procedure to minimize a loss function to update values of parameters of the decoder (e.g., the weights). In some implementations the loss function includes a perceptual loss and an adversarial loss.

In some embodiments, the decoder of the second machine learning model is trained by minimizing a perceptual loss. For example, the training subsystem computes an $L_1$ loss with respect to colors and multi-layers of a pretrained VGG network:

$$L_{percept} := \sum_i \|VGG^i[R_t^P] - VGG^i[I_t^P]\|_1 + \|R_t^P - I_t^P\|_1,$$

where the perceptual loss is based on training images of the garment (e.g., $I_t^P$) and generated images of the garment ($R_t^P$) as well as features extracted from the VGG network.

Alternatively, or additionally, the loss function used to train the decoder of the second neural network further includes an adversarial loss component. As noted above with respect to FIG. 2, in some implementations, the decoder 220D of the second machine learning model is part of a GAN including a discriminator for training. An adversarial loss is used to train the discriminator to classify consecutive frames as real (e.g., a sample image) or fake (e.g., an image generated by the decoder 220D).

Figure 5:
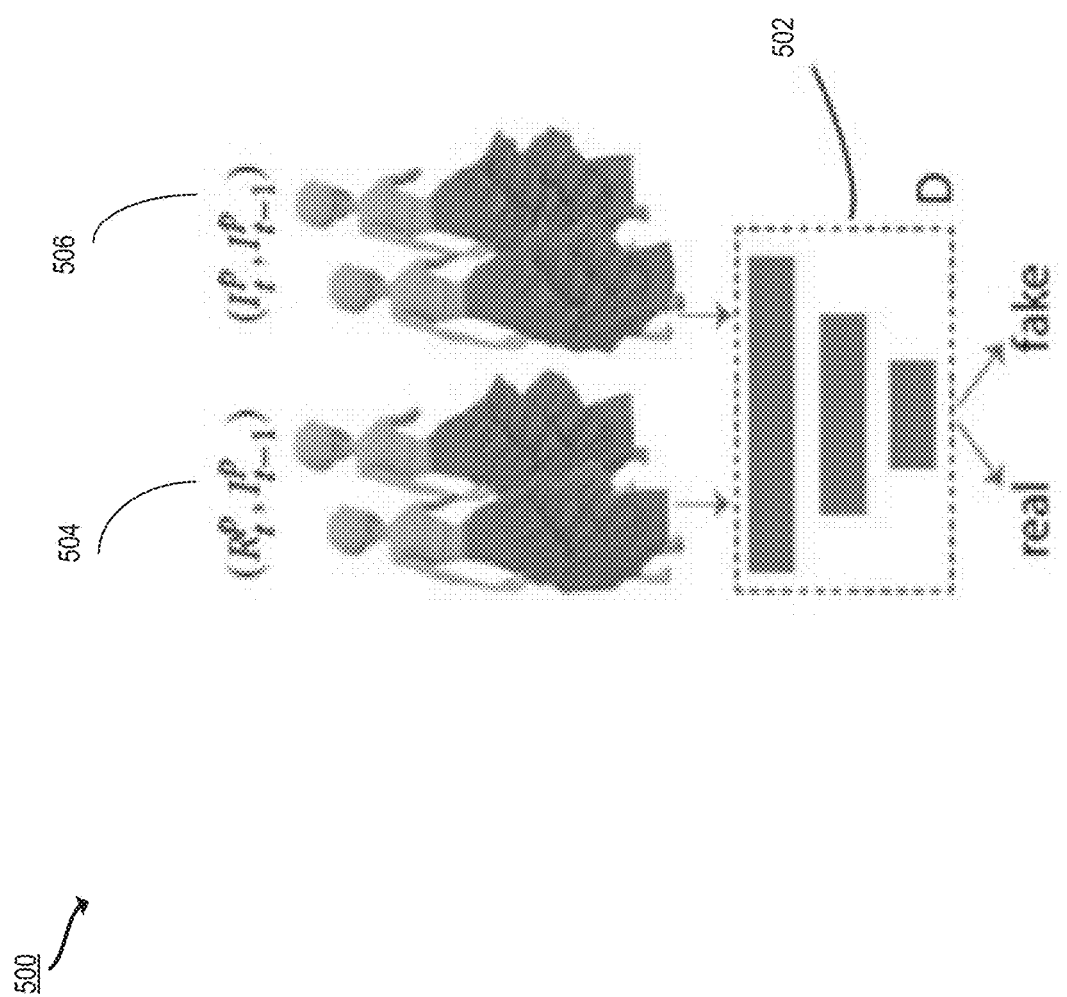
FIG. 5 depicts a schematic diagram illustrating techniques for training a machine learning model used to render a garment according to certain embodiments of the present disclosure.

FIG. 5 illustrates a schematic diagram illustrating techniques for training the decoder using adversarial loss. The training subsystem provides the discriminator network D 502 consecutive frames as input. The discriminator network D 502 classifies each synthesized rendered garment $R_t^P$ as real or fake. In some implementations, the training subsystem provides two input types to $D:[R_t^P,I_{t-1}^P]$ 504 with ground truth $[I_t^P,I_{t-1}^P]$ 506 and $[_{t+1}^P,R_t^P]$ with ground truth $[I_{t+1}^P,I_t^P]$. This ensures temporal consistency across frames. In some examples, the discriminator network D 502 is a patch-based discriminator, as described in Isola et al., "Image-to-Image Translation with Conditional Adversarial Networks," in *Proceedings of the IEEE Conference on Computer Vision and Pattern Recognition*, 1125-1134 (2017)). Given two renderings $[I_t^P,I_{t-1}^P]$ of neighboring frames, D 502 tries to identify if each N×N patch is real or fake in the spatial domain and the temporal domain along the channel direction of concatenation. The loss function for D 502 to minimize is:

$$D:=\mathrm{argmin}_D[L_{D_1}+L_{D_2}]$$

where $$L_{D_1}=-\log(D[I_t^P,I_{t-1}^P])-\log(1-D[I_t^P,I_{t-1}^P])$$

and $$L_{D_2}=-\log(D[I_{t+1}^P,I_t^P])-\log(1-D[I_{t+1}^P,I_t^P])$$

and the adversarial loss is defined as $$L_{GAN}=-\log(D[R_t^P,I_{t-1}^P])-\log(D[I_{t+1}^P,R_t^P])$$

In some implementations, the discriminator includes multiple layers, and the training subsystem computes the adversarial loss based on features extracted from the multiple layers of the discriminator. For example, the training subsystem applies feature matching in multiple discriminator layers $D^i[*]$ to enforce similarity across different scales of features:

$$L_{feat} = \sum_i \|D^i[R_t^P, I_{t-1}^P] - D^i[I_t^P, I_{t-1}^P]\|_1 + \sum_i \|D^i[I_{t+1}^P, R_t^P] - D^i[I_{t+1}^P, I_t^P]\|_1.$$

The weights of the network G as well as the neural features F are determined to minimize a loss function:

$$G,F:=\mathrm{argmin}_{G,F}[\gamma_1 L_{feat}+\gamma_2 L_{percept}+\gamma_3 L_{GAN}],$$

where $\gamma_1$, $\gamma_2$, and $\gamma_3$ are constants. Example values are $\gamma_1=5$, $\gamma_2=10$, and $\gamma_3=0.5$.

In some implementations, the training subsystem trains a specific decoder 220D for different garments. For example, for each coarse garment template and target garment combination, the training subsystem trains a specific decoder 220D along with a new set of neural textures. Different decoder neural networks may be trained for different garment structures (e.g., multi-layered skirts, short skirts, and long dresses), and used across different fabrics (e.g., silk and cotton).

Figure 6:
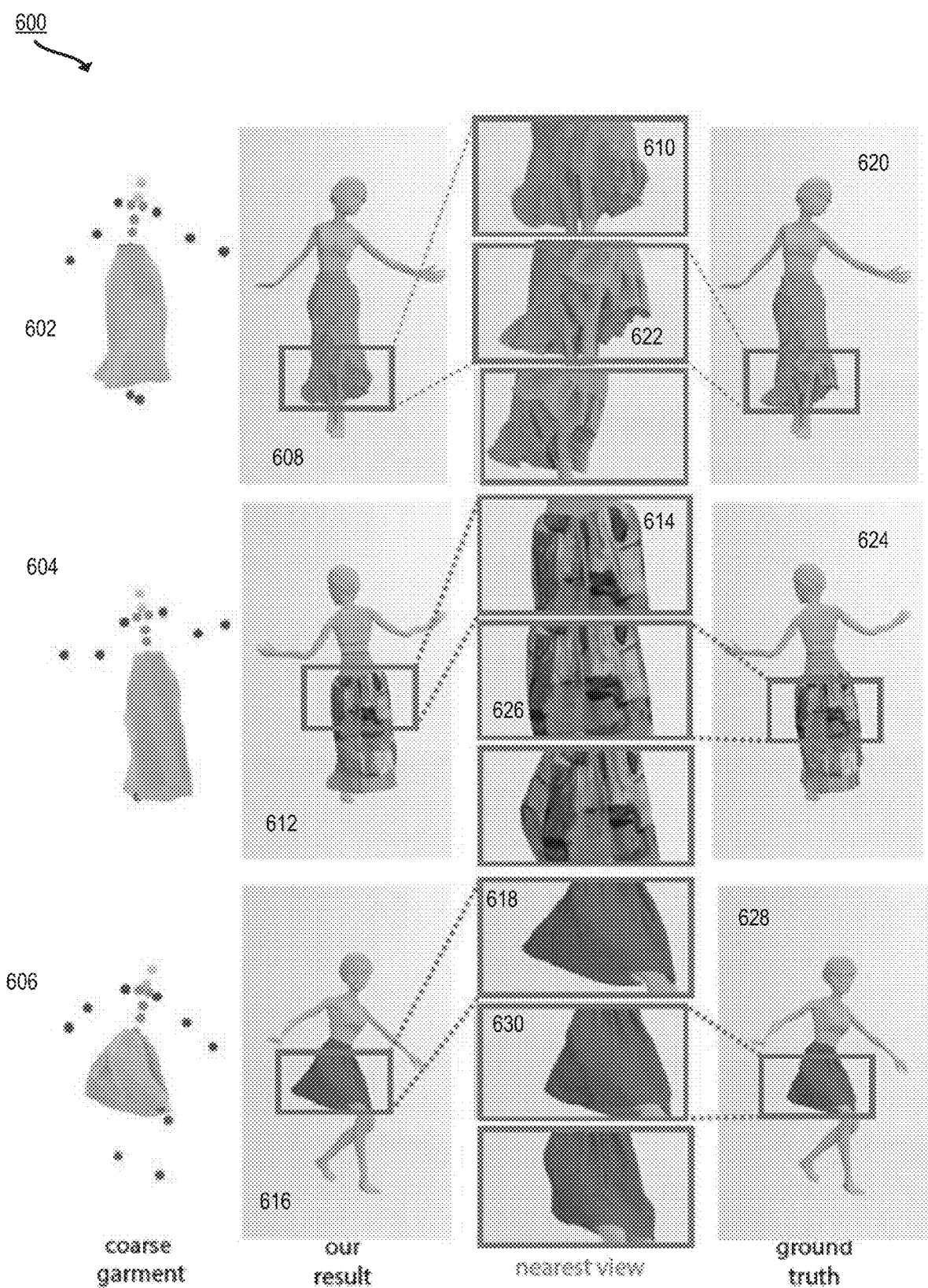
FIG. 6 depicts example results according to certain embodiments of the present disclosure.

FIG. 6 depicts a set of images 600 illustrating example results using the techniques described herein. Coarse garments with motion points 602, 604, and 606 are shown on the left. For each coarse garment with motion points, respective result rendered garments 608, 612, and 616 are shown, with close-up views 610, 614, and 618 showing the detail achieved. Ground truth images 620, 622, 624, 626, and 628. are shown for comparison. As shown in FIG. 6, the techniques of the present disclosure generate accurate and detailed rendered garment images.

Figure 7:
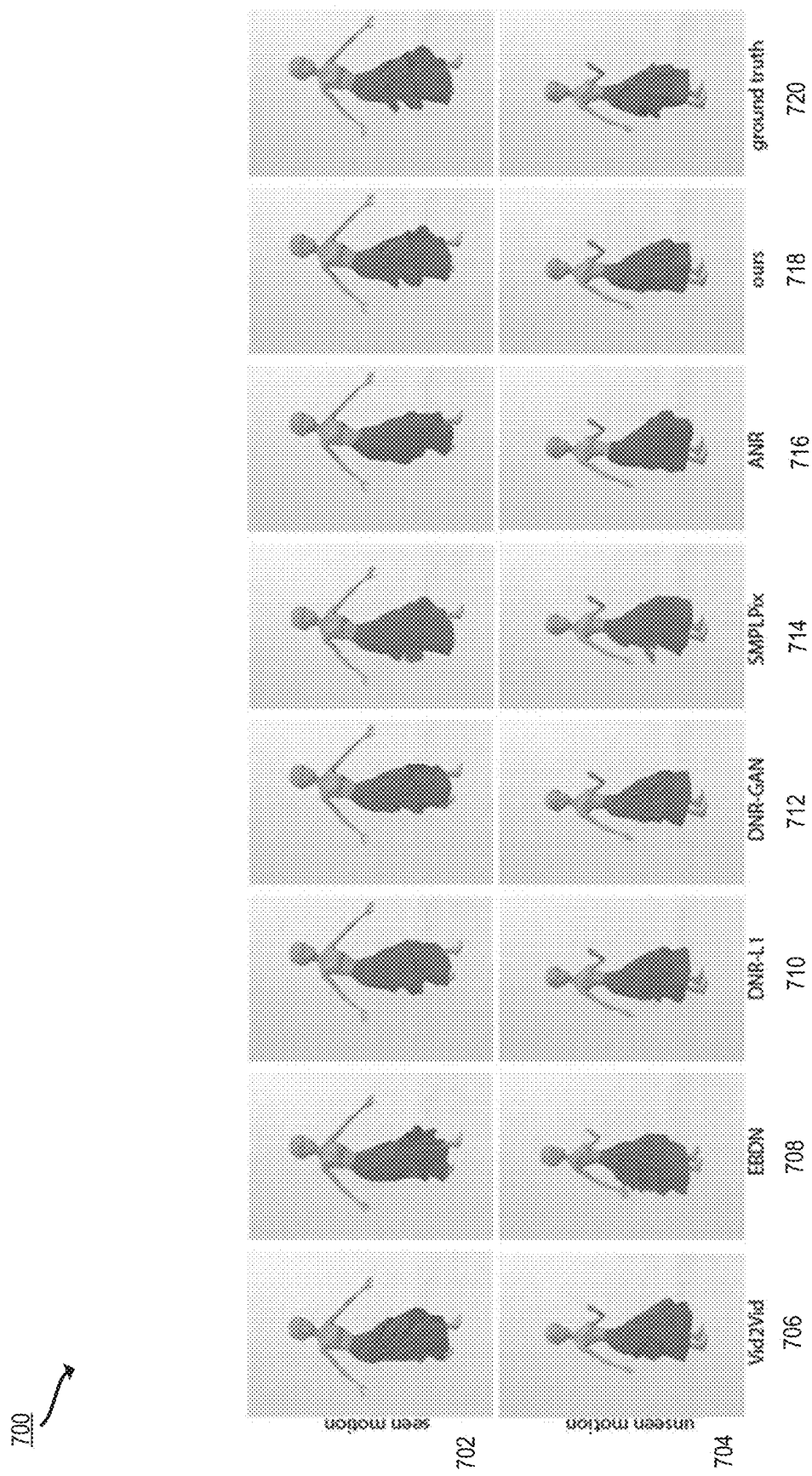
FIG. 7 depicts example results according to certain embodiments of the present disclosure.

FIG. 7 depicts a set of images 700 illustrating example results using the techniques described herein, compared with other techniques. The top row 702 represents seen motion (e.g., poses used to train the machine learning models). The top row 704 shows unseen motion (e.g., poses new to the machine learning models). As shown in FIG. 7, the results achieved using the techniques of the present disclosure 718 closely replicate the ground truth images 720. In comparison, the images 706-716 achieved using other techniques diverge significantly more from the ground truth. The other images shown from comparison were generated using Vid2Vid video translation for images 706 (see Wang et al., "Learning a Shared Shape Space for Multimodal Garment Design," *ACM Trans. Graph* 37, 6 (2018); EBDN for images 708 (see Chan et al., "Everybody Dance Now," in *Proceedings of the IEEE International Conference on Computer*

*Vision,* 5933-5942 (2019), DNR for images 710 and 712 (see Thies et al, supra), SMPLpix for images 714 (see Prokudin et al., "SMPLpix: Neural Avatars from 3D Human Models," in *Winter Conference on Applications of Computer Vision (WACV),* 1810-1819 (2021)), and ANR for images 716 (see Raj et al., "ANR-Articulated Neural Rendering for Virtual Avatars," arXiv:2012:12890 (2021)). As shown in FIG. 7, the accuracy of the garment rendering using the present techniques is greatly improved over these other methods.

The techniques of the present disclosure provide multiple advantages. As noted above and illustrated in FIG. 7, prior techniques suffer from difficulties in accurately rendering garments in motion, particularly for loose garments. As shown in FIG. 7, the techniques of the present disclosure address these issues and create rendered garments, even with complex shapes such as ruffles, that closely replicate the ground truth target images. Moreover, prior techniques suffer from slow and computationally expensive performance. Traditional techniques involve maintaining high precision across modeling, simulation and rendering stages, and much of the process must be repeated when any of the garment details, body motion, or camera location need to be updated. The techniques of the present disclosure address these issues by predicting a simplified coarse garment template sequence over frames and learning dynamic deep features for the coarse template. By decoupling these steps and using the specialized machine learning models and methods described herein, these techniques speed processing and reduce the strain on computational resources, in comparison with other techniques. These techniques further improve on other problems in prior systems including avoiding stiff garment appearance, removing artifacts, extending to loose or complex garments, and retaining consistency across camera views and frames.

Figure 8:
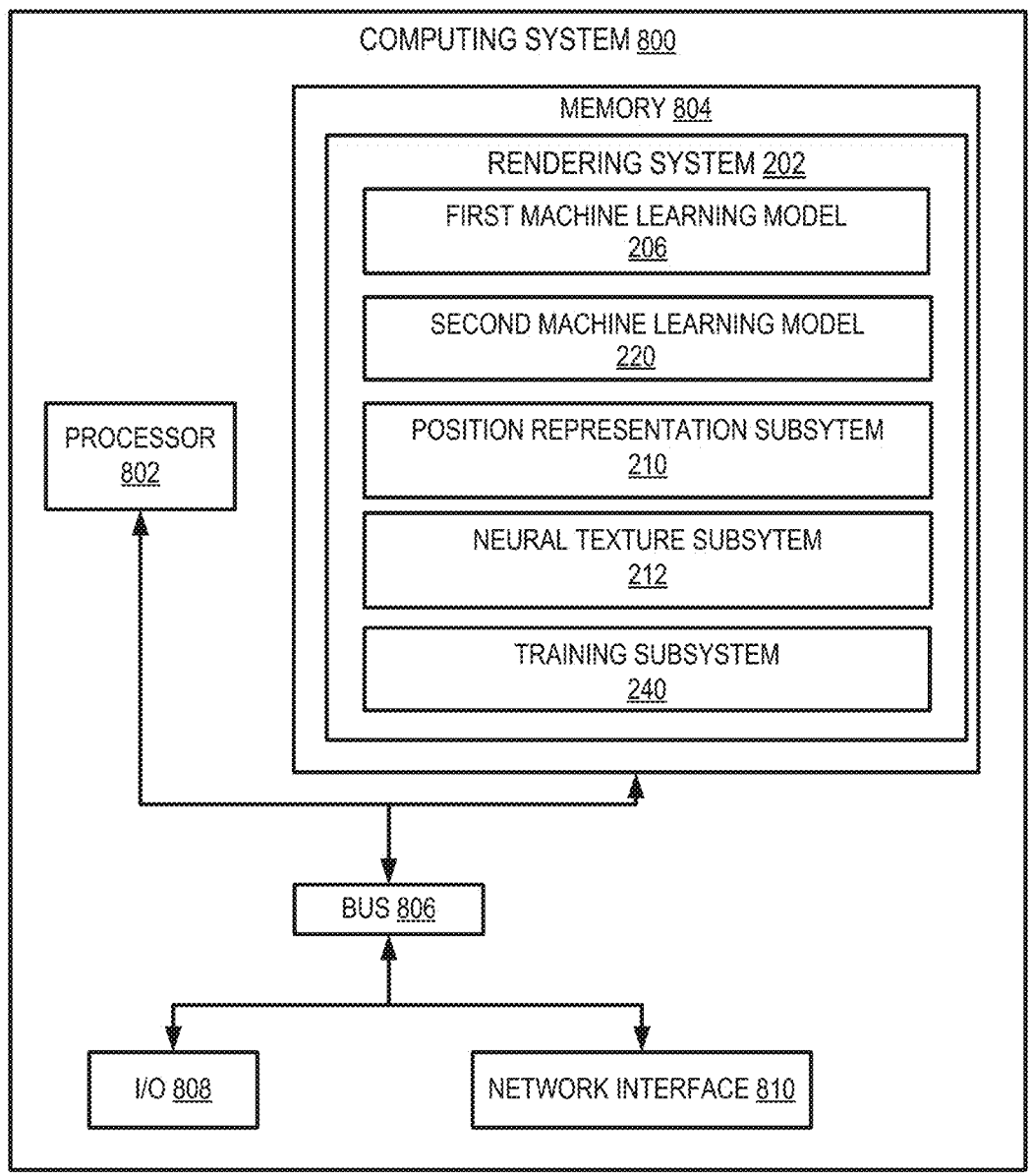
FIG. 8 an example of a computing system that performs certain operations described herein according to certain embodiments of the present disclosure.

Any suitable computing system or group of computing systems can be used for performing the operations described herein. For example, FIG. 8 depicts examples of computing system 800 that executes a rendering system 202 for performing garment rendering as described herein. In some embodiments, the rendering system 202 executed by the computing system 800 includes a first machine learning model 206, second machine learning model 220, position representation subsystem 210, neural texture subsystem 212, and training subsystem 240, as described above with respect to FIG. 2. In other embodiments, a separate computing system having devices similar to those depicted in FIG. 8 (e.g., a processor, a memory, etc.) executes one or more of the subsystems 206-240.

The depicted examples of a computing system 800 includes a processor 802 communicatively coupled to one or more memory components 804. The processor 802 executes computer-executable program code stored in a memory component 804, accesses information stored in the memory component 804, or both. Examples of the processor 802 include a microprocessor, an application-specific integrated circuit ("ASIC"), a field-programmable gate array ("FPGA"), or any other suitable processing device. The processor 802 can include any number of processing devices, including a single processing device.

The memory component 804 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 800 may also include a number of external or internal devices, such as input or output devices. For example, the computing system 800 is shown with one or more input/output ("I/O") interfaces 808. An I/O interface 808 can receive input from input devices or provide output to output devices. One or more buses 806 are also included in the computing system 800. The bus 806 communicatively couples one or more components of a respective one of the computing system 800.

The computing system 800 executes program code that configures the processor 802 to perform one or more of the operations described herein. The program code includes, for example, the first machine learning model 206, the second machine learning model 220, the training subsystem 240, or other suitable applications that perform one or more operations described herein. The program code may be resident in the memory component 804 or any suitable computer-readable medium and may be executed by the processor 802 or any other suitable processor. In some embodiments, the first machine learning model 206, the second machine learning model 220, the training subsystem 240 are stored in the memory component 804, as depicted in FIG. 8. In additional or alternative embodiments, one or more of the first machine learning model 206, the second machine learning model 220, the training subsystem 240 are stored in different memory devices of different computing systems. In additional or alternative embodiments, the program code described above is stored in one or more other memory devices accessible via a data network.

The computing system 800 can access data in any suitable manner. In some embodiments, some or all of one or more of these data sets, models, and functions are stored in the memory component 804, as in the example depicted in FIG. 8. For example, a computing system 800 that executes the training subsystem 240 can access training data stored by an external system.

In additional or alternative embodiments, one or more of these data sets, models, and functions are stored in the same memory device (e.g., one of the memory components 804). For example, a common computing system can host the first machine learning model 206 and the training subsystem 240 as well as the training data. In additional or alternative embodiments, one or more of the programs, data sets, models, and functions described herein are stored in one or more other memory devices accessible via a data network.

The computing system 800 also includes a network interface device 810. The network interface device 810 includes any device or group of devices suitable for establishing a wired or wireless data connection to one or more data networks. Non-limiting examples of the network interface device 810 include an Ethernet network adapter, a modem, and the like. The computing system 800 is able to communicate with one or more other computing devices via a data network using the network interface device 810.

Figure 9:
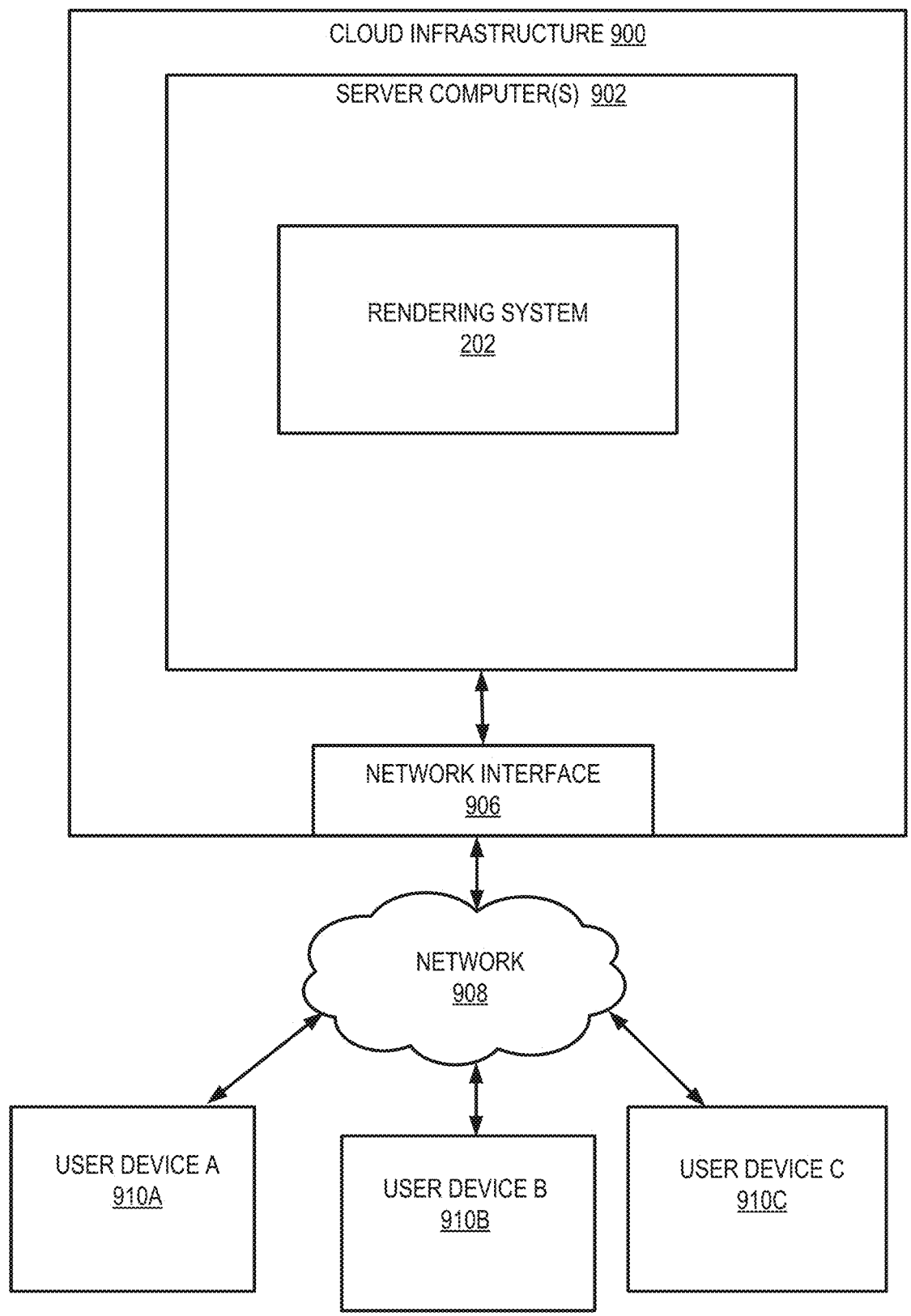
FIG. 9 depicts an example of a cloud computing environment that performs certain operations described herein according to certain embodiments of the present disclosure.

In some embodiments, the functionality provided by the computing system 800 may be offered via a cloud-based service provided by a cloud infrastructure 900 provided by a cloud service provider. For example, FIG. 9 depicts an example of a cloud infrastructure 900 offering one or more services including a service that offers garment rendering functionality as described in this disclosure. Such a service can be subscribed to and used by a number of user subscribers using user devices 910A, 910B, and 910C across a network 908. The service may be offered under a Software as a Service (SaaS) model. One or more users may subscribe to such as service.

In the embodiment depicted in FIG. 9, the cloud infrastructure 900 includes one or more server computer(s) 902 that are configured to perform processing for providing one or more services offered by the cloud service provider. One or more of server computer(s) 902 may implement an subsystems 206-240 of the rendering system 202 as depicted in FIG. 8. The subsystems 206-240 may be implemented using software only (e.g., code, program, or instructions executable by one or more processors provided by cloud infrastructure 900), in hardware, or combinations thereof. For example, one or more of the server computer(s) 902 may execute software to implement the services and functionalities provided by subsystems 206-240, where the software, when executed by one or more processors of the server computer(s) 902, causes the services and functionalities to be provided.

The code, program, or instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. In various examples, the server computer(s) 902 can include volatile memory, non-volatile memory, or a combination thereof.

In the embodiment depicted in FIG. 9, cloud infrastructure 900 also includes a network interface device 906 that enables communications to and from cloud infrastructure 900. In certain embodiments, the network interface device 906 includes any device or group of devices suitable for establishing a wired or wireless data connection to the network 908. Non-limiting examples of the network interface device 906 include an Ethernet network adapter, a modem, and/or the like. The cloud infrastructure 900 is able to communicate with the user devices 910A, 910B, and 910C via the network 908 using the network interface device 906.

A graphical interface may be displayed on each of the user devices user device A 910A, user device B 910B, and user device C 910C. A user of user device 910A may interact with the displayed graphical interface, for example, to enter an input image and/or image modification parameters. In response, processing for image processing may be performed by the server computer(s) 902.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:
   providing, to a first machine learning model trained to generate coarse garment templates of a garment, position data;
   generating, by the first machine learning model, a coarse garment template of the garment based on the position data, wherein the coarse garment template is an intermediate representation that reflects dynamics of the garment in motion with removal of garment details, wherein the garment details comprise patterns and/or textures of the garment;
   producing a neural texture for the garment, the neural texture comprising a multi-dimensional feature map characterizing garment details;
   providing the coarse garment template and the neural texture to a second machine learning model trained to render garment images; and generating, by the second machine learning model, a rendered garment image of the garment based on the coarse garment template of the garment and the neural texture.

2. The method of claim 1, wherein the second machine learning model comprises an encoder, a decoder, and a Spatially Adaptive Normalization (SPADE) block, and wherein generating the rendered garment image by the second machine learning model comprises:
generating, by the encoder, a first latent space representation of a first coarse garment template at a first time;
generating, by the encoder, a second latent space representation of a second coarse garment template at a second time;
providing the first latent space representation of the first coarse garment template and the second latent space representation of the second coarse garment template to the SPADE block;
generating, by the SPADE block, a normalized latent space representation of the coarse garment template; and
generating, by the decoder based on the normalized latent space representation of the garment generated by the SPADE block, the rendered garment image.

3. The method of claim 2, wherein the encoder comprises a set of convolutional layers that encode the neural texture into latent space representations of consecutive frames.

4. The method of claim 1, further comprising:
generating a motion feature image representing three-dimensional (3D) positions of points on a surface of the garment; and
concatenating the motion feature image with the neural texture to form a neural texture map, wherein the neural texture map is used to generate the rendered garment image.

5. The method of claim 1, wherein generating the rendered garment image further comprises:
generating, by the second machine learning model, a feature image for the garment;
providing a background image to the second machine learning model;
generating a mask; and
blending, by the second machine learning model, the feature image and the background image using the mask to generate the rendered garment image.

6. The method of claim 1, wherein the second machine learning model comprises a decoder neural network comprising a plurality of weights, the method further comprising training the decoder neural network by performing multiple iterations of a training procedure to minimize a loss function to update values of the weights of the decoder neural network.

7. The method of claim 6, wherein the decoder neural network is part of a generative adversarial network comprising a discriminator with multiple layers, and wherein the loss function comprises:
a perceptual loss based on a training image of the garment and a generated image of the garment; and
an adversarial loss based on features extracted from the multiple layers of the discriminator.

8. A system comprising:
a memory component; and
a processing device coupled to the memory component, the processing device to perform operations comprising:
generating, by a first machine learning model trained to generate coarse garment templates of a garment, a coarse garment template based on position data, wherein the coarse garment template is an intermediate representation that reflects dynamics of the garment in motion with removal of garment details, wherein the garment details comprise patterns and/or textures of the garment;
producing a neural texture for the garment, the neural texture comprising a multi-dimensional feature map characterizing garment details;
providing the coarse garment template and the neural texture to a second machine learning model trained to render garment images; and
generating, by the second machine learning model, a rendered garment image of the garment based on the coarse garment template of the garment and the neural texture.

9. The system of claim 8, wherein the second machine learning model comprises an encoder, a decoder, and a Spatially Adaptive Normalization (SPADE) block, and wherein generating the rendered garment image by the second machine learning model comprises:
generating, by the encoder, a first latent space representation of a first coarse garment template at a first time;
generating, by the encoder, a second latent space representation of a second coarse garment template at a second time;
providing the first latent space representation of the first coarse garment template and the second latent space representation of the second coarse garment template to the SPADE block;
generating, by the SPADE block, a normalized latent space representation of the coarse garment template; and
generating, by the decoder based on the normalized latent space representation of the garment generated by the SPADE block, the rendered garment image.

10. The system of claim 9, wherein the encoder comprises a set of convolutional layers that encode the neural texture into latent space representations of consecutive frames.

11. The system of claim 8, the operations further comprising:
generating a motion feature image representing three-dimensional (3D) positions of points on a surface of the garment; and
concatenating the motion feature image with the neural texture to form a neural texture map, wherein the neural texture map is used to generate the rendered garment image.

12. The system of claim 8, wherein generating, by the second machine learning model, a feature image for the garment;
providing a background image to the second machine learning model;
generating a mask; and
blending, by the second machine learning model, the feature image and the background image using the mask to generate the rendered garment image.

13. The system of claim 8, wherein the second machine learning model comprises a decoder neural network comprising a plurality of weights, the operations further comprising training the decoder neural network by performing multiple iterations of a training procedure to minimize a loss function to update values of the weights of the decoder neural network.

14. The system of claim 13, wherein the decoder neural network is part of a generative adversarial network comprising a discriminator with multiple layers, and wherein the loss function comprises:
- a perceptual loss based on a training image of the garment and a generated image of the garment; and
- an adversarial loss based on features extracted from the multiple layers of the discriminator.

15. A non-transitory computer-readable medium storing executable instructions, which when executed by a processing device, cause the processing device to perform operations comprising:
- providing, to a first machine learning model trained to generate coarse garment templates of a garment, position data;
- generating, by the first machine learning model, a coarse garment template based on the position data, wherein the coarse garment template is an intermediate representation that reflects dynamics of the garment in motion with removal of garment details, wherein the garment details comprise patterns and/or textures of the garment;
- producing a neural texture for the garment, the neural texture comprising a multi-dimensional feature map characterizing garment details;
- providing the coarse garment template and the neural texture to a second machine learning model trained to render garment images; and
- generating, by the second machine learning model, a rendered garment image of the garment based on the coarse garment template of the garment and the neural texture.

16. The medium of claim 15, wherein the second machine learning model comprises an encoder, a decoder, and a Spatially Adaptive Normalization (SPADE) block, and wherein generating the rendered garment image by the second machine learning model comprises:
- generating, by the encoder, a first latent space representation of a first coarse garment template at a first time;
- generating, by the encoder, a second latent space representation of a second coarse garment template at a second time;
- providing the first latent space representation of the first coarse garment template and the second latent space representation of the second coarse garment template to the SPADE block;
- generating, by the SPADE block, a normalized latent space representation of the coarse garment template; and
- generating, by the decoder based on the normalized latent space representation of the garment generated by the SPADE block, the rendered garment image.

17. The medium of claim 16, wherein the encoder comprises a set of convolutional layers that encode the neural texture into latent space representations of consecutive frames.

18. The medium of claim 15, the operations further comprising:
- generating a motion feature image representing three-dimensional (3D) positions of points on a surface of the garment; and
- concatenating the motion feature image with the neural texture to form a neural texture map, wherein the neural texture map is used to generate the rendered garment image.

19. The medium of claim 15, wherein the second machine learning model comprises a decoder neural network comprising a plurality of weights, the operations further comprising training the decoder neural network by performing multiple iterations of a training procedure to minimize a loss function to update values of the weights of the decoder neural network.

20. The medium of claim 19, wherein the decoder neural network is part of a generative adversarial network comprising a discriminator with multiple layers, and wherein the loss function comprises:
- a perceptual loss based on a training image of the garment and a generated image of the garment; and
- an adversarial loss based on features extracted from the multiple layers of the discriminator.

* * * * *